United States Patent [19]

Dominquez et al.

[11] 4,435,349

[45] * Mar. 6, 1984

[54] METHOD FOR MAKING A REINFORCED RIM ELASTOMER

[75] Inventors: Richard J. G. Dominquez; Doris M. Rice, both of Austin, Tex.

[73] Assignee: Texaco Inc., White Plains, N.Y.

[*] Notice: The portion of the term of this patent subsequent to Mar. 3, 1998 has been disclaimed.

[21] Appl. No.: 365,750

[22] Filed: Apr. 5, 1982

[51] Int. Cl.$^3$ .......................... B29C 5/00; B29C 3/02
[52] U.S. Cl. ........................................................ 264/257
[58] Field of Search ............ 264/257, 258, 240, 328.1, 264/328.2, 328.6; 521/121, 124; 528/55, 58

[56] References Cited

U.S. PATENT DOCUMENTS

| | | | |
|---|---|---|---|
| 4,119,585 | 10/1978 | Kenney et al. | 521/121 |
| 4,136,046 | 1/1979 | Hirshman et al. | 521/121 |
| 4,148,854 | 4/1979 | Cordis et al. | 264/45.3 |
| 4,239,857 | 12/1980 | Harper | 521/121 |
| 4,254,069 | 3/1981 | Dominguez et al. | 264/45.3 |
| 4,281,096 | 7/1981 | Nomura et al. | 264/45.3 |
| 4,364,887 | 12/1982 | Becht et al. | 264/258 |

*Primary Examiner*—Willard E. Hoag
*Attorney, Agent, or Firm*—Jack H. Park; Kenneth R. Priem; David L. Mossman

[57] ABSTRACT

A method for making a high strength composite of a reinforcing mat impregnated with reaction injection molded (RIM) polyurethane elastomer is disclosed. The method comprises placing the reinforcing mat in a mold cavity and injecting into the mold cavity a formulation capable of forming a reaction injection molded polyurethane elastomer comprising a polyol of above about 500 equivalent weight, a chain extending agent, a delayed action catalyst and a polyisocyanate.

6 Claims, No Drawings

METHOD FOR MAKING A REINFORCED RIM ELASTOMER

BACKGROUND OF THE INVENTION

1. Field of the Invention

The invention concerns the field of reinforced reaction injection molded polyurethanes.

2. Description of the Prior Art

Reaction injection molding (RIM) is a technique for the rapid mixing and molding of large, fast-curing urethane parts. RIM polyurethane parts are used in a variety of exterior body applications on automobiles where their light weight contributes to energy conservation. RIM parts are generally made by rapidly mixing active hydrogen-containing materials with polyisocyanate and placing the mixture into a mold where the reaction proceeds. These active hydrogen-containing materials comprise high molecular weight polyhydric polyethers and low molecular weight active hydrogen-containing compounds. After reaction and demolding, the parts may be subjected to an additional curing step which comprises placing the parts in an ambient temperature of about 250° F. or greater.

For large parts such as hoods or trunk decks of automobiles, RIM polyurethane elastomers may tend to sag and distort, thus placing a limitation upon the uses of these materials in large part applications. One meethod of alleviating this sagging and distortion problem is to place a reinforcing mat in the mold and injecting the polyurethane RIM elastomer resin into the mold so that the mat is impregnated with the RIM elastomer formulation and the resulting part is greatly increased in stiffness so that the sagging does not occur. The technique of placing a mat to reinforce polyurethane materials is not new in itself. Saidla's U.S. Pat. No. 4,073,840 discloses reinforcing mats for use in polyurethane foams. The Saidla materials, however, appear to be rigid polyurethane foams and not elastomeric materials.

Problems heretofore connected in placing reinforcing mats in a mold and subsequently injecting RIM polyurethane resins into the mold resulted in such problems as displacing the mat from its original position and incomplete fill of the mold and/or part distortion caused by the mat not being uniformly distributed throughout the finished composite. These problems are thought to be caused by the liquid RIM reactants attaining an early high viscosity due to fast initial section.

We have discovered a method whereby these problems may be overcome and a complete composite may be obtained which has excellent properties and which does not present processing problems such as incomplete mold fill.

SUMMARY OF THE INVENTION

The invention is a method for making a high strength composite comprising a reinforcing mat impregnated with reaction injection molded polyurethane elastomer resin, the method comprising placing a reinforcing mat in a mold cavity and injecting into the said mold cavity a formulation capable of forming a reaction injection molded polyurethane elastomer comprising a polyol of above about 500 equivalent weight, a chain extending agent, a delayed action catalyst and a polyisocyanate. The invention is also the resulting RIM polyurethane composition.

DESCRIPTION OF THE PREFERRED EMBODIMENTS

The RIM elastomer of this invention may be microcellular or solid and range from about 0.05 to 0.25 inches in thickness. To form a microcellular RIM elastomer, a minor amount of a blowing agent to be discussed below is used to form microcells in the interior portion of the RIM part. In the preferred procedure, the microcellular RIM part is between about 0.1 and 0.15 inches thick and about one-third of the part at its center portion has microcells and the outer portions comprise about one-third on each side of the center part, or about two-thirds of the total RIM part is essentially a solid although some microcells are present, diminishing in numbers as the skin is approached. If a solid RIM elastomer is desired, no additional blowing agent is added to the formulation. The densities of the RIM parts suitable in the process of the invention average from about 53 to 97 pounds per cubic foot. Thus, the core containing the microcells may range from about 30 to 90 pounds per cubic foot and the outer portion comprising two-thirds of the RIM part would range from about 65 to 100 pounds per cubic foot. If a solid RIM elastomer is desired, no blowing agent is added and the RIM part density ranges from about 70 to 100 pounds per cubic foot.

The RIM formulation useful in this invention is one which will remain at a reasonably level viscosity until the mold cavity is filled and the reinforcing mat is permeated. This may be achieved by use of a particular RIM formulation. This formulation comprises a polyol of above about 500 equivalent weight, a chain extending agent comprising an active hydrogen containing compound of at least 2 functionality, a polyisocyanate and a catalyst consisting essentially of delayed action catalyst(s).

The polyols useful in the RIM elastomers of this invention include polyether polyols, polyester diols, triols, tetrols, etc., having an equivalent weight of from about 500 to about 3,000. Those polyether polyols based on trihydric initiators which have hydroxyl numbers ranging from about 56 to about 24 are especially preferred. The polyethers may be prepared from lower alkylene oxides such as ethylene oxide, propylene oxide, butylene oxide or mixtures of propylene, butylene and/or ethylene oxide. In order to achieve the rapid reaction rates which are normally required for molding RIM polyurethane elastomers, it is preferable that the polyol be capped with enough ethylene oxide to increase the reaction rate of the polyurethane mixture. Normally at least 50% primary hydroxyl is preferred, although amounts of primary hydroxyl less than this are acceptable if the reaction rate is rapid enough to be useful in industrial application.

The chain extenders useful in the process of this invention are preferably difunctional. Mixtures of difunctional and trifunctional chain extenders are also useful in this invention. The chain extenders useful in this invention include diols and amino alcohols. Low molecular weight linear diols such as 1,4-butanediol and ethylene glycol have been found suitable for use in this invention. Ethylene glycol is preferred. Other chain extenders, including cyclic diols such as 1,4-cyclohexane diol and ring containing diols such as bishydroxyethylhydroquinone, amide or ester containing diols or amino alcohols would also be suitable as chain extenders in the practice of this invention. Chain extenders which increase the viscosity of the reaction mixture quickly are not useful in this invention.

A wide variety of aromatic polyisocyanates may be used here. Typical aromatic polyisocyanates include p-phenylene diisocyanate, polymethylene polyphenylisocyanate, 2,6-toluene diisocyanate, dianisidine diisocyanate, bitolylene diisocyanate, napthalene-1,4-diisocyanate, bis(4-isocyanatophenyl)methane, bis(3-methyl-3-isocyantophenyl)methane, bis(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalyts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

By far the most preferred aromatic polyisocyanate is methylene bis(4-phenylisocyanate) or MDI. Pure MDI, quasi-prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst. The liquid product is a mixture of pure MDI and modified MDI:

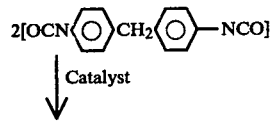

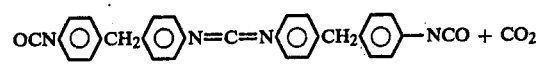

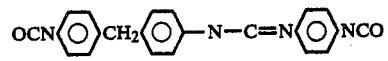

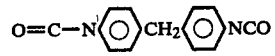

Uretonimine

Examples of commercial materials of this type are Upjohn's ISONATE ® 125M (pure MDI) and ISONATE 143L ("liquid"MDI). Preferably the amount of isocyanates used is the stoichiometric amount based on all the ingredients in the formulation or greater than the stoichiometric amount.

In this embodiment of the invention, the polyisocyanate not prereacted with any active hydrogen containing compounds such as polyols before the polyisocyanate stream and polyol streams are mixed to form the RIM part.

The reinforcing mats useful in this invention comprise glass mats, graphite mats, polyester mats, polyaramid mats such as KEVLAR ® mats and mats made from any fibrous material. Also, although the particular mats used in the examples given in this patent are random continuous strand mats made of glass fiber bundles, woven mats and oriented mats such as uniaxial or triaxial mats may also be used.

The catalysts useful in this invention are delayed action catalysts. One such catalyst or a mixture of delayed action catalysts are useful. The delayed action metal catalysts are preferred. In a particularly preferred embodiment of this invention, a stannic diester of a thiol acid (an alkyltin mercaptide) is used as the catalyst of this invention. A product of this type is sold as FOMREZ ® UL-29 and is a product of Witco Chemical Company. The concentration of the catalyst is from about 0.05 to 1.0% based on the weight of the reaction mixture. This catalyst concentration range is a guide only since other amounts may be useful depending on the particular catalyst or catalyst system and formulation. Therefore, the concentration of the catalyst may be altered by one skilled in the art to perform in an optimum manner in any given combination of reaction conditions.

The RIM formulation may contain a great number of other recognized ingredients such as additional crosslinkers, extenders and the like.

If a microcellular RIM part as discussed above is desired, then a minor amount of a blowing agent may be added to the formulation. By minor amount, we mean an amount ranging from about 0.05 to about 5 wt.% based on the total formulation. Blowing agents may include halogenated low-boiling hydrocarbons, such as trichloromonofluoromethane and methylene chloride, carbon dioxide, nitrogen, etc., used.

When no blowing agent is added, the RIM part is essentially a solid. However, minute amounts of water or gases may be present in the raw materials. Therefore, some microcells, though relatively few in number, may be present in a solid RIM part.

Other conventional formulation ingredients may also be employed, such as, for example, foam stabilizers, also known as silicone oils or emulsifiers. The foam stabilizer may be an organic silane or siloxane. For example, compounds may be used having the formula:

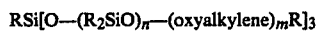

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

In a particularily preferred embodiment, a 5500 molecular weight polyether polyol based on a trihydric initiator (hydroxyl number of about 33), ethylene glycol, PLURONIC F-98 and FOMREZ UL-29 are mixed and comprise the polyol stream. The polyisocyanate stream comprises liquid MDI. A glass mat is placed in the mold cavity. The polyol stream and the polyisocyanate stream are mixed and injected into the mold cavity, resulting in a RIM elastomer which is cured at 250° F. for about 30 minutes.

The examples which follow exemplify the improvement obtained by the process of the invention. However, these examples are not intended to limit the scope of the invention.

GLOSSARY OF TERMS AND MATERIALS

THANOL® SF-5505—a 5500 molecular weight polyether triol containing approximately 80% primary hydroxyl groups.

THANOL® SF-6503—a 6500 molecular weight polyether triol containing approximately 70% primary hydroxyl groups.

L5430 Silicone Oil—a silicone glycol co-polymer surfactant containing reactive hydroxyl groups. Product of Union Carbide.

THANCAT® DMDEE—Dimorpholinodiethylether

FOMREZ® UL-29—Dioctyltin dithioester, a stannic diester of a thiol acid (an alkyltin mercaptide). The exact composition is unknown. Product of Witco Chemical Co.

ISONATE® 143L—pure MDI isocyanate modified so that it is a liquid at temperatures when MDI crystallizes—product of the Upjohn Co.

ISONATE® 191—A liquid MDI enriched polymeric isocyanate.

Quasi-prepolymer L-55-0—A quasi-prepolymer formed by reacting weights of ISONATE 143L and THANOL SF-5505.

PLURONIC® F-98—an ethylene oxide/propylene oxide co-polymer of about 14,000 molecular weight containing an ethylene oxide cap.

THANOL® C-64—a mixture of 96.7% ethylene glycol and 3.3% PLURONIC F-98 (a surface-active agent and dispersant).

THANCAT® DME—N,N'Dimethylethanolamine

EXAMPLE 1

THANOL SF-6503 (16.0 pbw), THANOL C-64 (6.66 pbw) and FOMREZ UL-29 (0.1 pbw) were premixed and charged into the B-component working tank of an Accuratio VR-100 RIM machine. ISONATE 143L was charged into the A-component working tank. The volumetric A/B ratio was adjusted to 1.22 at a total throughput of about 60 pounds/minute, resulting in a RIM polyurethane with an isocyanate index of about 1.05. The components were impingement mixed at high pressure (approximately 2200 psi) and injected into a closed steel mold having a cavity measuring 18"×18"×⅛". Glass mats (Owens-Corning Fiberglas continuous strand mat 8610, 1½ ounce) were preplaced in the mold prior to injection of the RIM polyurethane material. In the case of only one mat, small spacers were preplaced across the gate area of the mold and along the mold edge nearest the mix head to hold the mat in place during injection. When two or more mats were inserted into the mold, no spacers were required. The glass mats were in all cases cut slightly smaller than the 18"×18" mold dimensions. The parts were filled out completely and had no evidence of bowing or other distortion.

EXAMPLE II

The same formulation of Example I was studied as a function of glass content. In this case, the continuous strand mats were placed between surfacing veils. These surfacing veils are light (1 ounce per square yard) glass veils used to improve surface appearance; namely, to limit the visibility of glass strands on the surface. Physical properties for this formulation with different glass levels appear in Table I.

TABLE I

| # Glass mats | 1 | 2 | 3 | 4 | 0 |
|---|---|---|---|---|---|
| Veils (one on each side) | yes | yes | yes | yes | no |
| Approx wt. % of glass total | 12.5 | 25 | 37.5 | 50 | 0 |
| Tensile strength, psi | 7,100 | 12,700 | 14,800 | 20,200 | 4,000 |
| Room T flexural modulus, psi | 332,000 | 460,000 | 572,000 | 844,000 | 132,000 |
| Heat sag, in. ½ hr @ 311° F., 6" overhang | 0.04 | 0.02 | 0.00 | 0.02 | 1.2 |
| ½ hr @ 400° F., 6" overhang | 0.12 | 0.05 | 0.07 | 0.04 | >4 |
| Izod impact, notched ft/lbs/in | 8.7 | 12.9 | 23.8 | 16.7 | 7.7 |

As is obvious from Table I, increasing the glass level results in tougher composite materials. Twenty-five percent glass loading or greater yield materials with high tensile and flexural modulus which are very heat sag resistant even at 400° F.

EXAMPLE III

A lower modulus elastomer matrix with the following formulation: THANOL SF-6503 (100.0 pbw), THANOL C-64 (26.0 pbw) and FOMREZ UL-29 (0.5 pbw) with ISONATE 143L was processed in a similar fashion to Example II. This formulation had a room temperature flexural modulus of about 60,000 psi unfilled. Reinforced with two mats (~25% glass), it had the following properties:

Tensile strength, psi: 7,900
Room temperature, flexural modulus, psi: 390,000
Heat sag, in.:
    ½ Hr @ 311° F., 6" overhang: 0.02
    ½ hr @ 400° F., 6" overhang: 0.37
Izod impact, notched ft/lbs/in: 13.5

EXAMPLE IV

A higher modulus elastomer matrix with the following formulation: THANOL SF-6503 (8.0 pbw), THANOL C-64 (6.66 pbw) and FOMREZ UL-29 (0.07 pbw) with ISONATE 143L was processed in a similar fashion to Example II. This formulation had a room temperature flexural modulus of about 225,000 psi unfilled. Reinforced with three mats (~37.5% glass), it had the following properties:
  Tensile strength, psi: 22,000
  Room temperature flexural modulus, psi: 937,000
  Heat sag, in.:
    ½ hr @ 311° F., 6" overhang: 0.00
    ½ hr @ 400° F., 6" overhang: 0.03
  Izod impact, notched, ft/lbs/in: 15.9

The formulations presented in Examples II, III and IV all have the same percent catalyst (FOMREZ UL-29) in the B-component. Also, the appropriate amount of ISONATE 143L was reacted with the B-component in the above three examples to produce an elastomer with an isocyanate index of 1.05.

Examples I, II, III and IV indicate that useful composites can be prepared by this invention from RIM urethane matrices having a wide stiffness range and, further, the level of reinforcing glass can be varied over a wide range.

EXAMPLE V

The following formulation: THANOL SF-5505 (120 pbw), THANOL C-64 (6.66 pbw) and FOMREZ UL-29 (0.043 pbw) with ISONATE 143L was processed similarly to Example II. This formulation has a room temperature flexural modulus of about 156,000 psi unfilled. Reinforced with three mats (~37.5% glass), it has the following properties:
  Tensile strength, psi: 19,500
  Room temperature flexural modulus, psi: 740,000
  Heat sag, in.:
    ½ hr @ 311° F., 6" overhang: 0.01
    ½ hr @ 400° F., 6" overhang: 0.07
  Izod impact, notched, ft/lbs/in: 15.1

This example indicates that various high molecular weight polyether polyols are useful in the practice of this invention.

EXAMPLE VI

The following formulation: THANOL SF-6503 (8.0 pbw), THANOL C-64 (6.66 pbw) and FOMREZ UL-29 (0.105 pbw) with ISONATE 191 was processed similarly to Example II except that an isocyanate index of 1.08 was used. The formulation had a room temperature flexural modulus of about 250,000 psi unfilled. Reinforced with two mats (~25% glass), it had the following properties:
  Tensile strength, psi: 13,600
  Room temperature flexural modulus, psi: 717,000
  Heat sag, in.:
    ½ hr @ 311° F., 6" overhang: 0.00
    ½ hr @ 400° F., 6" overhang: 0.06
  Izod impact, notched, ft/lbs/in: 9.9

This example indicates that various low viscosity MDI type isocyanates are useful in the practice of this invention.

EXAMPLE VII

The following formulation: THANOL SF-6503 (16.0 pbw), 1,4-butanediol (9.35 pbw), PLURONIC F-98 surfactant (0.25 pbw) and FOMREZ UL-29 (0.1 pbw) with ISONATE 143L were processed in a similar fashion to Example II. This formulation had a room temperature flexural modulus of about 104,000 psi unfilled. Reinforced with two mats (~25% glass), it had the following properties:
  Tensile strength, psi: 9,300
  Room temperature flexural modulus, psi: 433,000
  Heat sag, in.
    ½ hr @ 311° F., 6" overhang: 0.00
    ½ hr @ 400° F., 6" overhang: 0.32

This example indicates that various low molecular weight, low viscosity diol chain extenders are useful in the practice of this invention.

COMPARATIVE EXAMPLE VIII

The following formulation: THANOL SF-5505 (16.0 pbw), THANOL C-64 (6.66 pbw), THANCAT DME (0.1 pbw), FOMREZ UL-29 (0.025 pbw) and dibutyltin dilaurate (0.15 pbw) with THANATE L-55-0 and ISONATE 143L (ratio by weight 1:5.16) were processed in a similar fashion to Example II. This is a typical high flexural modulus formulation which has been used in the preparation of milled glass filled automobile exterior body panels. When glass mats are inserted into the mold and the RIM formulation injected through them as in Example II, problems with mold filling and part warpage were observed. This example indicates that conventional RIM elastomers based on standard catalyst packages and quasi-prepolymer type isocyanates are not useful in injection molding where mats are used for reinforcement.

COMPARATIVE EXAMPLE IX

The following formulation: THANOL 6503 (12.0 pbw), THANOL C-64 (6.66 pbw) and dibutyltin dilaurate (0.01 pbw) with ISONATE 143L were processed in a similar fashion to Example II. This formulation had a cream time (about 7 sec) similar to that of Example II. When molded with two glass mats (~25% glass), the part showed considerable skin loss when removed from the mold in one minute, as was done in Example II.

COMPARATIVE EXAMPLE X

To the B-component of Example IX sufficient dibutyltin dilaurate was added to increase the catalyst level to 0.04 parts by weight. This is about 40% of the catalyst level of Example II. The cream time of this formulation was about 2 seconds. The state of cure on release was similar to Example II. However, incomplete fill and part distortion were observed.

Comparative Examples IX and X indicate the importance of delay action catalysts in the practice of this invention. These catalysts can be added in sufficient quantity to ensure good cure and skin characteristics and yet the cream time of the reaction is slow enough to ensure good fill and distortion free parts.

We claim:

1. A method for making a high strength composite comprising a reinforcing mat impregnated with reaction injection molded polyurethane elastomer resin, the method comprising placing a reinforcing mat in a mold cavity and injecting into the mold cavity a polyol of about 5500 molecular weight based on a trihydric initiator, ethylene glycol, a stannic diester of a thiol acid and a polyisocyanate.

2. A method for making a high strength composite comprising a reinforcing mat impregnated with reaction injection molded polyurethane elastomer resin, the method comprising placing a reinforcing mat in a mold cavity and injecting into the mold cavity a polyol of above about 500 equivalent weight, a chain extending agent comprising an active hydrogen-containing compound of at least 2 functionality, a polyisocyanate and a catalyst consisting essentially of delayed action catalyst.

3. A method as in claim 2 wherein the delayed action catalyst is a metal catalyst.

4. A method as in claim 3 wherein the delayed action catalyst is a tin catalyst.

5. A method as in claim 4 wherein the delayed action catalyst is a stannic diester of a thiol acid.

6. A method as in claim 2 wherein the reinforcing mat is a glass mat.

* * * * *